No. 623,981. Patented May 2, 1899.
W. H. BUTLER.
BICYCLE STAND.
(Application filed Feb. 27, 1897.)

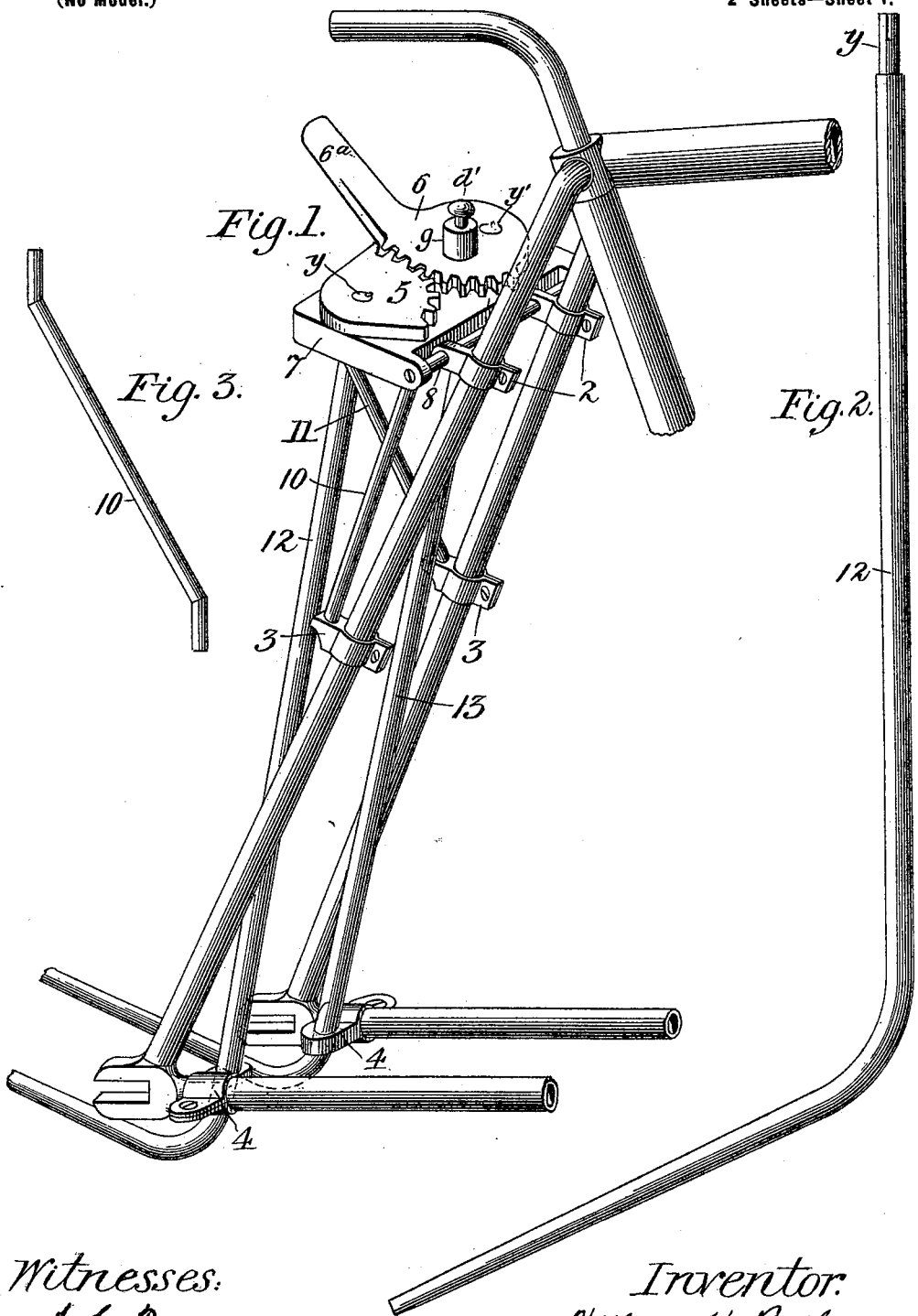

(No Model.) 2 Sheets—Sheet 2.

Witnesses:
N. J. Browning
J. E. Canfield

Inventor.
William H. Butler
by A. D. Cole, Attorney.

THE NORRIS PETERS CO., PHOTO-LITHO., WASHINGTON, D. C.

UNITED STATES PATENT OFFICE.

WILLIAM H. BUTLER, OF MAYSVILLE, KENTUCKY, ASSIGNOR OF ONE-HALF TO A. D. COLE, OF SAME PLACE.

BICYCLE-STAND.

SPECIFICATION forming part of Letters Patent No. 623,981, dated May 2, 1899.

Application filed February 27, 1897. Serial No. 625,430. (No model.)

*To all whom it may concern:*

Be it known that I, WILLIAM H. BUTLER, a citizen of the United States, residing at Maysville, in the county of Mason and State of Kentucky, have invented a certain new and useful Bicycle-Stand, of which the following is a specification.

This invention relates to supports for bicycles and the like, and has for its object to provide a device of the class described which can be easily applied to any of the bicycles of common or ordinary form to act as a support when dismounted or to be operated by the rider to hold the bicycle in an upright position while seated on the saddle.

The essential features of the invention are supports adapted to rest upon the ground when in use, brackets secured to the rear forks from which the supports are suspended, and a platform carrying the mechanism for operating the device.

Further objects and advantages of this invention will be hereinafter more fully shown and particularly pointed out in the accompanying specification and claims.

Figure 4:
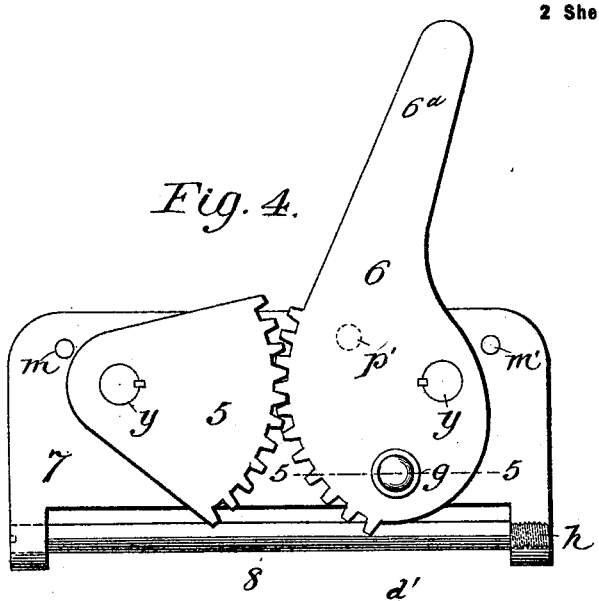
Figure 5:
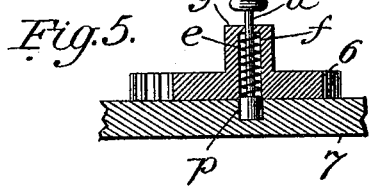
Figure 6:
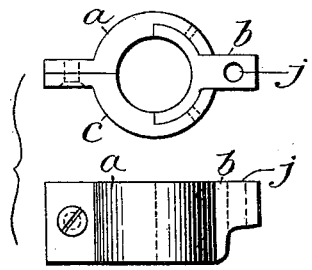
Figure 7:
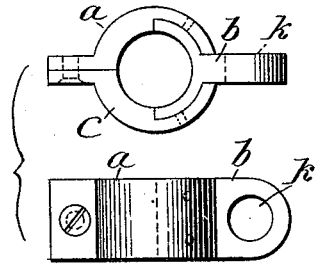

In the drawings, Figure 1 is a perspective view of a portion of a bicycle having my improvement applied thereto. Fig. 2 is a detail perspective view of one of the supporting-rods. Fig. 3 is a detail perspective view of one of the braces for the platform. Fig. 4 is an enlarged detail top plan view of the platform and segmental gears. Fig. 5 is a detail sectional view of the means for locking the segmental gears. Figs. 6 and 7 are detail views of the clamps.

Corresponding parts in the several figures are denoted by like characters of reference.

Referring to the drawings, 1 designates the rear forks of a bicycle of common or ordinary form. Upon the lower part thereof, just in advance of where the axle of the rear wheel is secured, is provided a clamp 4, forming a guide for the supporting-arms 13. Each of these arms has its lower extremity curved or bent at an angle thereto and is normally held in a plane parallel with the rear wheel, which places the ends of the supporting-arms out of the way of the rider and at a sufficient distance from the ground to prevent accidental contact therewith when riding the machine.

The upper extremity of each of these supporting-arms passes through holes in a supporting shelf or bracket 7, which is connected to clamps 2 upon the upper part of the rear forks by means of a rod 8, passing through lugs upon the shelf 7 and through the clamps 2. Keyed or otherwise secured to the upper ends of supports 13, which pass through said shelf, are segmental gears 5 and 6, meshing with each other, as plainly shown in the drawings. The gear 6 is provided with an operating-handle $6^a$ and is locked at a determined position by means of a spring-operated pawl $d$. This pawl is mounted in a tubular casing $g$, formed integral with the gear 6. The upper end of the pawl protrudes from the casing and is provided with an operating head or thumb-piece $d'$, and the lower end thereof is enlarged, as at $p$, which is adapted to fit in a suitable recess in the shelf, whereby the gears are locked. A coil-spring $e$ encircles the stem of the pawl, bearing against the shoulder formed by the enlarged portion $p$ and against the upper portion of the casing to normally hold the pawl down.

To support the bracket, I provide two brace-rods 10, of a form similar to that shown in Fig. 3, having their opposite ends bent in the same plane, but in opposite directions. The lower ends of these brace-rods are seated in the offset lugs of the clamps 2 and extend upward and diagonally across each other and into the opposite corners of the bracket, as shown at $m$ and $m'$ in Fig. 4.

As will be readily understood, the normal position of my support is, with the segmental gears, so turned as to hold the lower extremities of the rods 10 turned upward and alongside of the rear wheel of the bicycle and with the spring-pawl $d$ engaging the recess in the supporting-bracket to lock and hold the device from accidental displacement. By raising the pawl from its seat and operating the segmental gears by means of handle $6^a$ to turn the ends of the supporting-arms downward and away from the rear wheel the extremities of said arms will rest upon the ground, and thus effectually hold the bicycle in an upright position.

By my improved construction and arrangement of parts I have provided a support of the class described which is easily and quickly applied to any bicycle, is always in position for use, and one which adds very little to the weight thereof. I therefore do not wish to be understood as limiting myself to the precise construction and arrangement of parts as herein shown and described, as it is obvious that various changes may be made in the minor details of construction and arrangement without departing from the spirit and scope of my invention.

Having described my invention, what I claim, and desire to secure by Letters Patent, is—

1. The combination in a bicycle-support, of a pair of arms having feet and arranged upon opposite sides of the bicycle a bracket carried by the frame of the bicycle, and provided with a notch or recess, and supporting the arms, a pair of intermeshing gears carried by the arms whereby the latter are operated, and a spring-operated pawl mounted in a tubular casing carried by one of the gears and adapted to engage the recess in the bracket and thus lock the arms out of operation.

2. The combination with the rear forks of a bicycle, of a bracket, clamps provided upon the rear forks and carrying the bracket, brace-rods seated in other clamps provided upon the rear forks and which extend upwardly and diagonally across each other and into the opposite corners of the said bracket, and supporting-arms provided with feet and journaled in said bracket to turn upon their own axis as a pivot, and arranged upon opposite sides of the rear wheel, and means for turning the arms to engage the feet with the ground or floor.

3. In a bicycle-support, the combination with the rear upright forks of a bicycle, of a pair of supporting-arms mounted upon said rear forks and extending downwardly upon opposite sides of the rear wheel and between the wheel and the respective members of the rear forks, each arm having a foot at its lower extremity, guides for the lower portion of the arms, each guide being provided upon the horizontal fork members and extending inward therefrom receiving its respective arm and permitting of the same being turned therein, and means whereby the arms may be turned in the guides to engage the feet with the ground or floor.

4. The combination in a bicycle-support, of a pair of arms having feet, said arms being arranged upon opposite sides of the bicycle, a bracket supported upon the frame of the bicycle and carrying the arms and intermeshing gears engaging the arms and adapted to operate the latter, one of the gears having a lock adapted to engage the bracket and lock the arms against turning, consisting of a spring-operated pawl mounted in a tubular casing and carried by one of the gears and adapted to engage with a recess in said bracket.

5. The combination, with the rear forks of a bicycle, of a bracket, clamps provided upon the rear forks and carrying the bracket, brace-rods engaging the bracket and supported in other clamps provided upon the rear forks, and supporting-arms provided with feet and carried by the bracket, and arranged upon opposite sides of the rear wheel, and means for turning the arms to engage the feet with the ground or floor.

WILLIAM H. BUTLER.

In presence of—
W. R. WARDER,
T. C. WILSON.